US012694478B2

(12) United States Patent
Wu et al.

(10) Patent No.: US 12,694,478 B2
(45) Date of Patent: Jul. 28, 2026

(54) NETWORK MODEL COMPRESSION METHOD, APPARATUS AND DEVICE, IMAGE GENERATION METHOD, AND MEDIUM

(71) Applicant: Beijing Zitiao Network Technology Co., Ltd., Beijing (CN)

(72) Inventors: Jie Wu, Beijing (CN); Shaojie Li, Beijing (CN); Xuefeng Xiao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 18/571,116

(22) PCT Filed: Sep. 19, 2022

(86) PCT No.: PCT/CN2022/119638
§ 371 (c)(1),
(2) Date: Dec. 15, 2023

(87) PCT Pub. No.: WO2023/045870
PCT Pub. Date: Mar. 30, 2023

(65) Prior Publication Data
US 2024/0281930 A1     Aug. 22, 2024

(30) Foreign Application Priority Data
Sep. 24, 2021     (CN) .......................... 202111122307.5

(51) Int. Cl.
G06T 5/20          (2006.01)
G06V 10/74         (2022.01)
G06V 10/771        (2022.01)

(52) U.S. Cl.
CPC .............. *G06T 5/20* (2013.01); *G06V 10/761* (2022.01); *G06V 10/771* (2022.01)

(58) Field of Classification Search
USPC ......................... 382/155–156, 159, 232–233
See application file for complete search history.

(56) References Cited

U.S. PATENT DOCUMENTS

| | | | | |
|---|---|---|---|---|
| 10,410,114 B2 * | 9/2019 | Kang | ..................... | G06N 3/045 |
| 11,934,958 B2 * | 3/2024 | Shu | ............................ | G06T 5/40 |

(Continued)

FOREIGN PATENT DOCUMENTS

| | | |
|---|---|---|
| CN | 109978792 A | 7/2019 |
| CN | 110084281 A | 8/2019 |

(Continued)

OTHER PUBLICATIONS

Li et al., Revisting Discriminator in GAN Compression: A Generator-discriminator Cooperative Compression Scheme, arXiv: 2110. 14439v2 [cs.CV] Nov. 9, 2021, pp. 1-19 . . . (Year: 2021).*

(Continued)

*Primary Examiner* — Ishrat I Sherali
(74) *Attorney, Agent, or Firm* — Astute IP Law Group

(57) ABSTRACT

Embodiments of the present disclosure provide a network model compression method, apparatus and device, an image generation method, and a medium. The network model compression method includes: performing pruning processing on the first generator to obtain a second generator; and configuring states of convolution kernels in the first discriminator to enable a part of the convolution kernels to be in an activated state and the other part of the convolution kernels to be in a suppressed state, so as to obtain a second discriminator. A loss difference between the first generator and the first discriminator is a first loss difference, a loss difference between the second generator and the second (Continued)

discriminator is a second loss difference, and an absolute value of a difference value between the first loss difference and the second loss difference is less than a first preset threshold.

17 Claims, 4 Drawing Sheets

(56) References Cited

U.S. PATENT DOCUMENTS

| | | | | |
|---|---|---|---|---|
| 2020/0302295 A1 | | 9/2020 | Tung et al. | |
| 2021/0295173 A1* | | 9/2021 | Choi | G06N 3/0464 |
| 2022/0019855 A1* | | 1/2022 | Chen | G06N 3/084 |
| 2024/0320966 A1* | | 9/2024 | Wu | G06V 10/7715 |

FOREIGN PATENT DOCUMENTS

| | | | | |
|---|---|---|---|---|
| CN | 110796251 | A | 2/2020 | |
| CN | 110796619 | A | 2/2020 | |
| CN | 111967573 | A | 11/2020 | |
| CN | 112052948 | * | 12/2020 | G06N 3/045 |
| CN | 112052948 | A | 12/2020 | |
| CN | 113112015 | A | 7/2021 | |
| CN | 113159173 | A | 7/2021 | |
| CN | 113313133 | A | 8/2021 | |
| CN | 113780534 | A | 12/2021 | |
| WO | 2019015466 | A1 | 1/2019 | |

OTHER PUBLICATIONS

Hou et al., "the ACGAN Model based on Generative Adversarial Networks", Information Technology and Informatization, May 28, 2020, pp. 201-204.

Extended European Search Report received for European Patent Application No. 22871916.7, mailed on Oct. 10, 2024, 10 pages.

Hou et al., "Slimmable Generative Adversarial Networks", Proceedings Of The AAAI Conference On Artificial Intelligence, vol. 35, No. 9, May 18, 2021, 8 pages.

Jin et al., "Teachers Do More Than Teach: Compressing Image-to-Image Models", arXiv, Available on internet at: https://arxiv.org/pdf/2103.03467v1, Mar. 5, 2021, 18 pages.

Communication pursuant to Rules 70(2) and 70a(2) EPC for European Application No. 22871916.7, mailed on Oct. 29, 2024, 1 page.

* cited by examiner

S110

Performing pruning processing on a first generator to obtain a second generator;

S120

Configuring states of convolution kernels in the first discriminator to enable a part of the convolution kernels to be in an activated state and the other part of the convolution kernels to be in a suppressed state, so as to obtain a second discriminator.

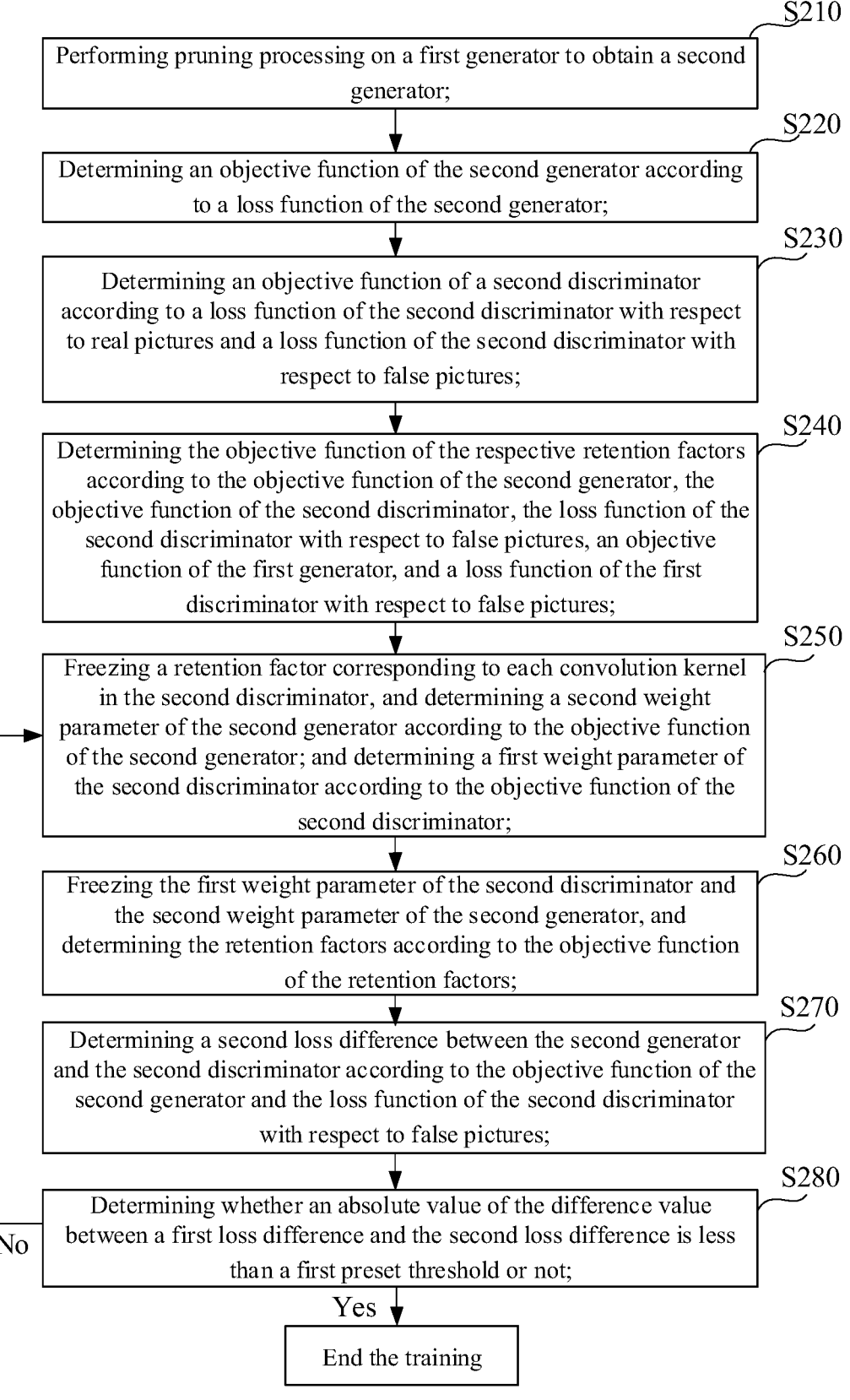

S210

Performing pruning processing on a first generator to obtain a second generator;

S220

Determining an objective function of the second generator according to a loss function of the second generator;

S230

Determining an objective function of a second discriminator according to a loss function of the second discriminator with respect to real pictures and a loss function of the second discriminator with respect to false pictures;

S240

Determining the objective function of the respective retention factors according to the objective function of the second generator, the objective function of the second discriminator, the loss function of the second discriminator with respect to false pictures, an objective function of the first generator, and a loss function of the first discriminator with respect to false pictures;

S250

Freezing a retention factor corresponding to each convolution kernel in the second discriminator, and determining a second weight parameter of the second generator according to the objective function of the second generator; and determining a first weight parameter of the second discriminator according to the objective function of the second discriminator;

S260

Freezing the first weight parameter of the second discriminator and the second weight parameter of the second generator, and determining the retention factors according to the objective function of the retention factors;

S270

Determining a second loss difference between the second generator and the second discriminator according to the objective function of the second generator and the loss function of the second discriminator with respect to false pictures;

S280

Determining whether an absolute value of the difference value between a first loss difference and the second loss difference is less than a first preset threshold or not;

No

Yes

End the training

FIG. 2

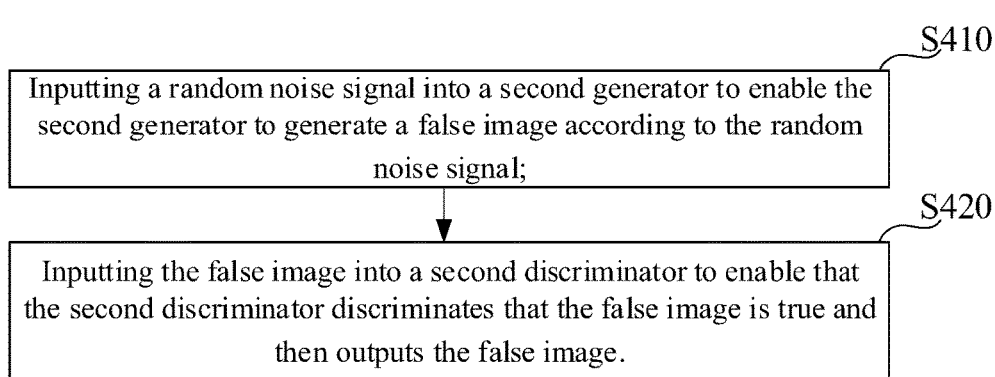

S410

Inputting a random noise signal into a second generator to enable the second generator to generate a false image according to the random noise signal;

S420

Inputting the false image into a second discriminator to enable that the second discriminator discriminates that the false image is true and then outputs the false image.

FIG. 4

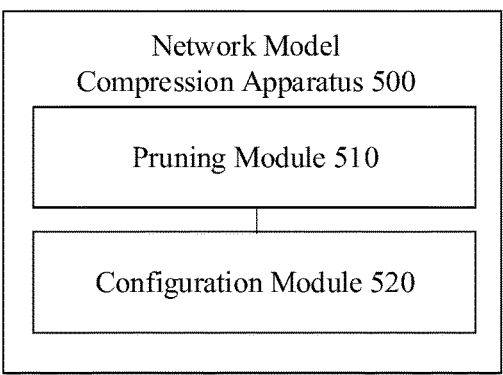

Network Model
Compression Apparatus 500

Pruning Module 510

Configuration Module 520

FIG. 5

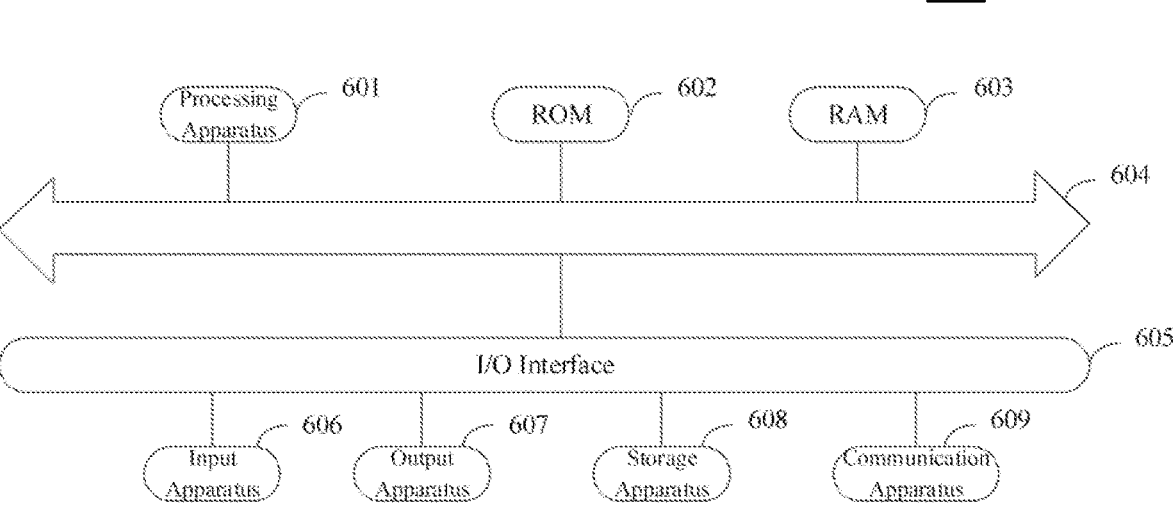

600

601 Processing Apparatus

602 ROM

603 RAM

604

605 I/O Interface

606 Input Apparatus

607 Output Apparatus

608 Storage Apparatus

609 Communication Apparatus

FIG. 6

NETWORK MODEL COMPRESSION METHOD, APPARATUS AND DEVICE, IMAGE GENERATION METHOD, AND MEDIUM

CROSS-REFERENCE TO RELATED APPLICATION

This is a national stage application filed under 35 U.S.C. 371 based on International Patent Application No. PCT/CN2022/119638 filed Sep. 19, 2022, which claims the priority of Chinese Patent Application No. 202111122307.5, filed on Sep. 24, 2021, entitled "NETWORK MODEL COMPRESSION METHOD, APPARATUS AND DEVICE, IMAGE GENERATION METHOD, AND MEDIUM," the disclosures of which are incorporated herein by reference in their entireties.

TECHNICAL FIELD

The present disclosure relates to the field of computer technology and, in particular, to a network model compression method, apparatus and device, an image generation method, and a medium.

BACKGROUND

Generative Adversarial Network (GAN) is a deep learning model and is one of the most promising methods for unsupervised learning on complex distributions in recent years, which is widely used in various image synthesis tasks, such as image generation, image resolution, and super-resolution.

However, GAN' huge computational amount and memory requirements seriously hinder its deployment to edge devices with limited resources. Therefore, in the related art, this problem is solved by compressing generators in the GAN. However, this will destroy the Nash equilibrium between the generators and discriminators, resulting in the mode collapse phenomenon in images generated by the generators.

SUMMARY

The present disclosure provides a network model compression method, apparatus and device, an image generation method, and a medium.

A first aspect of the embodiments of the present disclosure provides a network model compression method, a network model to be compressed includes a first generator and a first discriminator, and the network model compression method includes:

performing pruning processing on the first generator to obtain a second generator;

and configuring states of convolution kernels in the first discriminator to enable a part of the convolution kernels to be in an activated state and the other part of the convolution kernels to be in a suppressed state, so as to obtain a second discriminator;

a loss difference between the first generator and the first discriminator is a first loss difference, a loss difference between the second generator and the second discriminator is a second loss difference, and an absolute value of a difference value between the first loss difference and the second loss difference is less than a first preset threshold.

In an embodiment, configuring states of convolution kernels in the first discriminator to enable a part of the convolution kernels to be in an activated state and the other part of the convolution kernels to be in a suppressed state, so as to obtain a second discriminator, includes:

freezing a retention factor corresponding to each convolution kernel in the second discriminator, and determining a first weight parameter of the second discriminator, in which the retention factor is used for characterizing importance of a convolution kernel corresponding the retention factor;

freezing the first weight parameter of the second discriminator and a second weight parameter of the second generator, and determining respective retention factors;

and repeatedly performing operations of determining the first weight parameter of the second discriminator and determining the respective retention factors until the absolute value of the difference value between the first loss difference and the second loss difference is less than the first preset threshold.

In an embodiment, the first weight parameter includes weight parameters corresponding to other elements in the second discriminator other than the respective retention factors.

In an embodiment, the second weight parameter includes weight parameters corresponding to elements in the second generator.

In an embodiment, determining a first weight parameter of the second discriminator includes:

determining the first weight parameter of the second discriminator according to an objective function of the second discriminator;

and the network model compression method further includes:

determining the second weight parameter of the second generator according to an objective function of the second generator.

In an embodiment, before determining the second weight parameter of the second generator according to an objective function of the second generator, the network model compression method further includes:

determining the objective function of the second generator according to a loss function of the second generator;

and determining the objective function of the second discriminator according to a loss function of the second discriminator with respect to real pictures and a loss function of the second discriminator with respect to false pictures.

In an embodiment, before determining the objective function of the second generator according to a loss function of the second generator, the network model compression method further includes:

taking the first generator and the first discriminator as a teacher generative adversarial network, and taking the second generator and the second discriminator as a student generative adversarial network;

and determining the objective function of the second generator according to a loss function of the second generator includes:

determining the objective function of the second generator according to a distillation objective function between the teacher generative adversarial network and the student generative adversarial network, and the loss function of the second generator.

In an embodiment, determining the objective function of the second generator according to a distillation objective function between the teacher generative adversarial network and the student generative adversarial network, and the loss function of the second generator, includes:

summing, according to weights, the distillation objective function and an objective function component determined according to the loss function of the second generator, to determine the objective function of the second generator.

In an embodiment, before determining the objective function of the second generator according to a distillation objective function between the teacher generative adversarial network and the student generative adversarial network, and the loss function of the second generator, the network model compression method further includes:

determining a first similarity metric function according to a similarity between intermediate feature maps of at least one layer in the first generator and the second generator;

inputting false pictures generated by the first generator into the first discriminator to obtain a first intermediate feature map of at least one layer in the first discriminator;

inputting false pictures generated by the second generator into the first discriminator to obtain a second intermediate feature map of at least one layer in the first discriminator;

determining a second similarity metric function according to a similarity between the first intermediate feature map of the at least one layer and the second intermediate feature map of the at least one layer;

and determining the distillation objective function according to the first similarity metric function and the second similarity metric function.

In an embodiment, determining a first similarity metric function according to a similarity between intermediate feature maps of at least one layer in the first generator and the second generator, includes:

inputting an intermediate feature map of an i-th layer in the first generator and an intermediate feature map of an i-th layer in the second generator into a similarity metric function to obtain a first sub-similarity metric function corresponding to the i-th layer, in which i is a positive integer, i takes a value from 1 to M, and M is a total number of layers of the first generator and the second generator;

and determining the first similarity metric function according to first sub-similarity metric functions corresponding to respective layers.

In an embodiment, determining a second similarity metric function according to a similarity between the first intermediate feature map of the at least one layer and the second intermediate feature map of the at least one layer, includes:

inputting a first intermediate feature map and a second intermediate feature map corresponding to a j-th layer into a similarity metric function to obtain a second sub-similarity metric function corresponding to the j-th layer, in which j is a positive integer, $1 \leq j \leq N$, j takes a value from 1 to N, and N is a total number of layers of the first discriminator;

and determining the second similarity metric function according to second sub-similarity metric functions corresponding to respective layers.

In an embodiment, determining the respective retention factors includes:

determining the respective retention factors according to an objective function of the respective retention factors;

when a retention factor is less than a second preset threshold, determining the retention factor to be 0;

and when a retention factor is greater than or equal to the second preset threshold, determining the retention factor to be 1.

In an embodiment, before determining the respective retention factors according to an objective function of the respective retention factors, the network model compression method further includes:

determining the objective function of the respective retention factors according to an objective function of the second generator, an objective function of the second discriminator, a loss function of the second discriminator with respect to false pictures, an objective function of the first generator, and a loss function of the first discriminator with respect to false pictures.

A second aspect of the embodiments of the present disclosure provides an image generation method, and the image generation method includes:

inputting a random noise signal into a second generator to enable the second generator to generate a false image according to the random noise signal;

and inputting the false image into a second discriminator to enable that the second discriminator discriminates that the false image is true and then outputs the false image, in which the second generator and the second discriminator are obtained by using the network model compression method according to the first aspect.

A third aspect of the embodiments of the present disclosure provides a network model compression apparatus, a network model to be compressed includes a first generator and a first discriminator, and the network model compression apparatus includes a pruning module and a configuration module;

the pruning module is configured to perform pruning processing on the first generator to obtain a second generator;

the configuration module is configured to configure states of convolution kernels in the first discriminator to enable a part of the convolution kernels to be in an activated state and the other part of the convolution kernels to be in a suppressed state, so as to obtain a second discriminator;

a loss difference between the first generator and the first discriminator is a first loss difference, a loss difference between the second generator and the second discriminator is a second loss difference, and an absolute value of a difference value between the first loss difference and the second loss difference is less than a first preset threshold.

A fourth aspect of the embodiments of the present disclosure provides a network model compression device, and the network model compression device includes:

a memory, storing a computer program;

and a processor, configured to execute the computer program, in which the computer program, when executed by the processor, causes the processor to perform the network model compression method according to the first aspect.

A fifth aspect of the embodiments of the present disclosure provides a computer-readable storage medium, storing a computer program, in which the computer program, when executed by a processor, implements the network model compression method according to the first aspect.

A sixth aspect of the embodiments of the present disclosure provides a computer program product, including a computer program carried on a non-transitory computer-readable medium, in which the computer program includes program code for performing the network model compression method according to the first aspect.

Technical solutions provided in the embodiments of the present disclosure have the following advantages compared with the prior art.

In the embodiments of the present disclosure, pruning processing is performed on the first generator to obtain a second generator; and states of convolution kernels in the first discriminator is configured to enable a part of the convolution kernels to be in an activated state and the other part of the convolution kernels to be in a suppressed state, so as to obtain a second discriminator; a loss difference between the first generator and the first discriminator is a first loss difference, a loss difference between the second generator and the second discriminator is a second loss difference, and an absolute value of a difference value between the first loss difference and the second loss difference is less than a first preset threshold. Because the embodiments of the present disclosure can cooperatively compress the generator and the discriminator, the compressed generator and the compressed discriminator can maintain Nash equilibrium, thereby avoiding the mode collapse phenomenon.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

FIG. 2 is a flowchart of a network model compression method according to an embodiment of the present disclosure;

FIG. 4 is a flowchart of an image generation method according to an embodiment of the present disclosure;

FIG. 5 is a schematic diagram of a structure of a network model compression apparatus according to an embodiment of the present disclosure; and FIG. 6 is a schematic diagram of a structure of a network model compression device according to an embodiment of the present disclosure.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

As GAN with a larger model usually consumes more computing resources, when it is applied to devices with a poor computing capacity such as mobile phones, the delay is long and real-time application requirements cannot be met. Therefore, in the related art, the overall model size of the GAN is reduced by compressing a generator. However, the applicant found that mode collapse phenomenon occurs when only the generator is compressed while the structure of a discriminator remains unchanged.

The applicant found through research that for a well-trained GAN, its generator and discriminator are comparable to each other in the state. After the generator is compressed, the performance of the generator will decrease, while the structure of the discriminator remains unchanged, that is, the performance of the discriminator remains unchanged, so that the Nash equilibrium between the generator and the discriminator is broken, resulting in mode collapse phenomenon.

In view of this, the embodiments of the present disclosure provide a network model compression method. By performing pruning processing on a first generator, a second generator is obtained, and states of convolution kernels in a first discriminator is configured to enable a part of the convolution kernels to be in an activated state and the other part of the convolution kernels to be in a suppressed state, so as to obtain a second discriminator, such that a first loss difference between the first generator and the first discriminator is close to a second loss difference between the second generator and the second discriminator, and thus the Nash equilibrium between the second generator and the second discriminator can be maintained, thereby avoiding the mode collapse phenomenon. Hereinafter, the method will be introduced with reference to specific embodiments.

Figure 1:
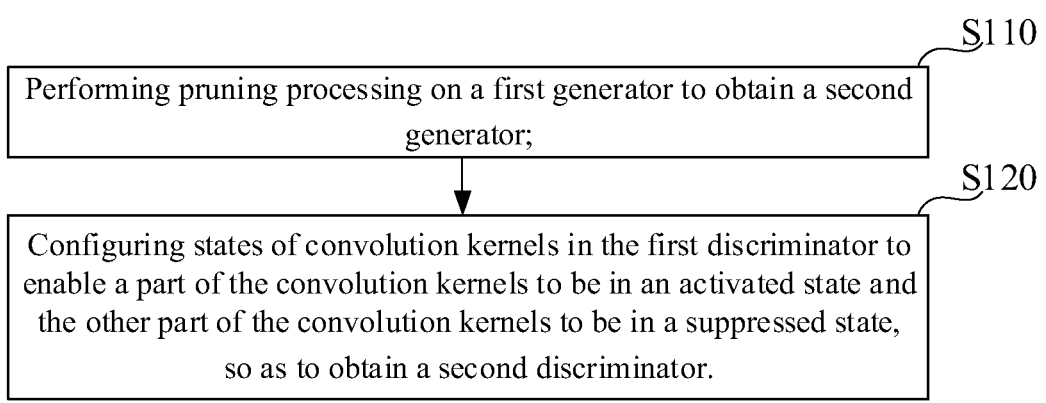
FIG. 1 is a flowchart of a network model compression method according to an embodiment of the present disclosure.

FIG. 1 is a flowchart of a network model compression method according to an embodiment of the present disclosure, and the method may be performed by a network model compression device. The network model compression device may be illustratively understood as a device with a computing function such as a portable Android device, a laptop computer, or a desktop computer. The method can compress a network model to be compressed including a first generator and a first discriminator. As shown in FIG. 1, the method of the present embodiment includes the following S110-S120.

S110: performing pruning processing on a first generator to obtain a second generator.

Specifically, the specific implementation for performing pruning processing on the first generator may be set by those skilled in the art according to the actual situation, and is not limited herein. In one possible embodiment, performing pruning processing on the first generator includes: selectively deleting convolution kernels in the first generator such that convolution kernels with the importance less than a preset importance threshold are deleted and convolution kernels with the importance greater than or equal to the preset importance threshold are retained.

Illustratively, each convolutional layer (CL) in the first generator is provided with a batch normalization (BN) layer, and each CL includes at least one convolution kernel. Each convolution kernel is correspondingly provided with a scaling factor in the BN layer corresponding to the CL to which the convolution kernel belongs, where the scaling factor is used for characterizing the importance of its corresponding convolution kernel. The scaling factor corresponding to each convolution kernel is added to an objective function of the first generator by direct summation to obtain $$L_G^T + \sum_1^A \text{scale}(a),$$

where $L_G^T$ is the objective function of the first generator, A is the total number of convolution kernels in the first generator, and scale(a) is a scaling factor for an a-th convolution kernel. Then, the first generator and the first discriminator are trained. Specifically, each training includes determining the scaling factor according to $$L_G^T + \sum_1^A \text{scale}(a).$$

When the total number of training times is reached, the scaling factors for respective convolution kernels are ranked from small to large, and the convolution kernels with smaller scaling factors are deleted using a binary search algorithm until the computational amount of the first generator meets the preset given computational amount.

Illustratively, each CL in the first generator includes at least one convolution kernel, and each convolution kernel is correspondingly provided with a weight parameter, where the weight parameter of a convolution kernel is used for characterizing the importance of the convolution kernel corresponding to the weight parameter. The weight parameter corresponding to each convolution kernel is added to the objective function of the first generator by direct summation to obtain $$L_G^T + \sum_1^A L(a),$$

where $L_G^T$ is the objective function of the first generator, A is the total number of convolution kernels in the first generator, and L(a) is a weight parameter for the a-th convolution kernel. Then, the first generator and the first discriminator are trained. Specifically, each training includes determining the weight parameter according to $$L_G^T + \sum_1^A L(a).$$

When the total number of training times is reached, the weight parameters for the respective convolution kernels are ranked from small to large, and the convolution kernels with smaller weight parameters are deleted using binary search algorithm until the computational amount of the first generator meets the preset given computational amount.

In the above-mentioned two manners, the specific number of training times and the specific value of the preset given computational amount may be set by those skilled in the art according to the actual situation, and are not limited herein.

S120: configuring states of convolution kernels in the first discriminator to enable a part of the convolution kernels to be in an activated state and the other part of the convolution kernels to be in a suppressed state, so as to obtain a second discriminator.

Specifically, when the compressed network model is put into use, the convolution kernels in the suppressed state do not work, and the convolution kernels in the activated state work normally.

Herein, a loss difference between the first generator and the first discriminator is a first loss difference, a loss difference between the second generator and the second discriminator is a second loss difference, and an absolute value of a difference value between the first loss difference and the second loss difference is less than a first preset threshold.

Specifically, the first loss difference is used for characterizing the difference between the performance of the first generator and the performance of the first discriminator, which may be obtained through calculation according to the objective function of the first generator and a loss function of the first discriminator with respect to false pictures. In the same way, the second loss difference is used for characterizing the difference between the performance of the second generator and the performance of the second discriminator, which may be obtained through calculation according to an objective function of the second generator and a loss function of the second discriminator with respect to false pictures.

It should be understood that because the network model to be compressed is a well-trained GAN, the first generator and the first discriminator are in a Nash equilibrium state. After the pruning processing is performed on the first generator and the states of the convolution kernels in the first discriminator are configured, the first loss difference can be close to the second loss difference, that is, the Nash equilibrium between the second generator and the second discriminator can be maintained. In this way, the mode collapse phenomenon can be avoided.

Specifically, the specific implementation for configuring states of the convolution kernels in the first discriminator may be set by those skilled in the art according to the actual situation, and is not limited herein.

In one possible embodiment, S120 includes: freezing a retention factor corresponding to each convolution kernel in the second discriminator, and determining a first weight parameter of the second discriminator; freezing the first weight parameter of the second discriminator and a second weight parameter of the second generator, and determining respective retention factors; and repeatedly performing operations of determining the first weight parameter of the second discriminator and determining the respective retention factors until the absolute value of the difference value between the first loss difference and the second loss difference is less than the first preset threshold.

In the step, the retention factor is used for characterizing the importance of a convolution kernel corresponding the retention factor.

Specifically, a retention factor is configured for each convolution kernel in the first discriminator to obtain a second discriminator, and an initial value of the retention factor corresponding to each convolution kernel may be 1. In the second discriminator obtained finally, the values of the retention factors corresponding to the convolution kernels in the activated state may be 1, and the values of the retention factors corresponding to the convolution kernels in the suppressed state may be 0.

Specifically, the first weight parameter described herein includes weight parameters corresponding to other elements in the second discriminator other than the respective retention factors for the convolution kernels. The second weight parameter described herein includes weight parameters corresponding to elements (e.g., convolution kernels) in the second generator.

Specifically, the specific implementation for determining the first weight parameter of the second discriminator may be set by those skilled in the art according to the actual situation, and is not limited herein. In one possible embodiment, determining the first weight parameter of the second discriminator includes: determining the first weight parameter of the second discriminator according to an objective function of the second discriminator. In one possible embodiment, before determining the first weight parameter of the second discriminator according to the objective function of the second discriminator, the method may further include determining the second weight parameter of the second generator according to an objective function of the second generator.

Specifically, the specific implementation for determining the respective retention factors may be set by those skilled in the art according to the actual situation, and is not limited herein. In one possible embodiment, the respective retention factors are determined according to an objective function of the respective retention factors.

Illustratively, firstly, the retention factor remains unchanged, and the second weight parameter of the second generator is determined by optimizing the objective function of the second generator; and the first weight parameter of the second discriminator is determined by optimizing the objective function of the second discriminator. Then, the first weight parameter of the second discriminator and the second weight parameter of the second generator remain unchanged, and the retention factors for the respective convolution kernels are determined by optimizing the objective function of the retention factors. When it is detected that the absolute value of the difference value between the first loss difference and the second loss difference is less than the first preset threshold, the training may be ended; when it is detected that the absolute value of the difference between the first loss difference and the second loss difference is greater than or equal to the first preset threshold, the method returns to perform the operations of "determining the second weight parameter of the second generator and determining the first weight parameter of the second discriminator" and "determining the retention factors for the respective convolution kernels" until the absolute value of the difference value between the first loss difference and the second loss difference is less than the first preset threshold.

In the embodiments of the present disclosure, the second generator is obtained by performing pruning processing on the first generator; and the states of the convolution kernels in the first discriminator are configured to enable a part of the convolution kernels to be in the activated state and the other part of the convolution kernels to be in the suppressed state, so as to obtain the second discriminator; the loss difference between the first generator and the first discriminator is the first loss difference, the loss difference between the second generator and the second discriminator is the second loss difference, and the absolute value of the difference value between the first loss difference and the second loss difference is less than the first preset threshold. Because the embodiments of the present disclosure can cooperatively compress the generator and the discriminator, the compressed generator and the compressed discriminator can maintain Nash equilibrium, thereby avoiding the mode collapse phenomenon. Moreover, the respective retention factors and the second weight parameter of the second generator and the first weight parameter of the second discriminator are alternately determined until the absolute value of the difference value between the first loss difference and the second loss difference is less than the first preset threshold, and the performance of the second generator and the second discriminator may be optimized in the process of approximating the second loss difference to the first loss difference.

FIG. 2 is a flowchart of a network model compression method according to an embodiment of the present disclosure. As shown in FIG. 2, the method of the present embodiment includes the following S210-S280.

S210: performing pruning processing on a first generator to obtain a second generator.

S220: determining an objective function of the second generator according to a loss function of the second generator.

Specifically, the specific implementation for S220 may be set by those skilled in the art according to the actual situation, and is not limited herein.

Illustratively, the objective function of the second generator is as follows:

$$L_G^S = E_{z \sim p(z)} \left[ f_G^S \left( -D^S \left( G^S(Z) \right) \right) \right];$$

where $L_G^S$ represents the objective function of the second generator, $G^S(Z)$ represents a false picture generated by the second generator according to a noise signal, $D^S(G^S(Z))$ represents a response value of the second discriminator to the false picture generated by the second generator, $f_G^S(-D^S(G^S(Z)))$ represents the loss function of the second generator, $E(*)$ represents an expected value of a distribution function, and $p(z)$ represents the noise distribution.

S230: determining an objective function of a second discriminator according to a loss function of the second discriminator with respect to real pictures and a loss function of the second discriminator with respect to false pictures.

Specifically, the specific implementation for S230 may be set by those skilled in the art according to the actual situation, and is not limited herein.

Illustratively, the objective function of the second discriminator is as follows:

$$L_D^S = E_{x \sim pdata} \left[ f_D^S (-D(x)) \right] + E_{z \sim p(z)} \left[ f_D^S \left( D^S \left( G^S(Z) \right) \right) \right];$$

where $L_D^S$ represents the objective function of the second discriminator, $D(x)$ represents a response value of the second discriminator to a real picture, $f_D^S(-D(x))$ represents the loss function of the second discriminator with respect to real pictures, $E(*)$ represents an expected value of the distribution function, pdata represents the distribution of real pictures, $G^S(Z)$ represents a false picture generated by the second generator according to a noise signal, $D^S(G^S(Z))$ represents a response value of the second discriminator to the false picture generated by the second generator, $f_D^S(D^S(G^S(Z)))$ represents the loss function of the second discriminator with respect to false picture generated by the second generator, and $p(z)$ represents the noise distribution.

S240: determining the objective function of the respective retention factors according to the objective function of the second generator, the objective function of the second discriminator, the loss function of the second discriminator with respect to false pictures, an objective function of the first generator, and a loss function of the first discriminator with respect to false pictures.

Specifically, the specific implementation for S240 may be set by those skilled in the art according to the actual situation, and is not limited herein.

Illustratively, the objective function of the retention factor is as follows:

$$L_{arch} = L_D^S + \left\| L_G^S - L_{Dfake}^S \right\| - \left\| L_G^T - L_{Dfake}^T \right\|;$$

$$L_{Dfake}^S = E_{z \sim p(z)} \left[ f_D^S \left( D^S \left( G^S(Z) \right) \right) \right];$$

$$L_G^T = E_{z \sim p(z)} \left[ f_G^T \left( -D^T \left( G^T(Z) \right) \right) \right];$$

$$L_{Dfake}^T = E_{z \sim p(z)} \left[ f_D^T \left( D^T \left( G^T(Z) \right) \right) \right];$$

where $L_{arch}$ represents the objective function of the retention factor, $L_G^S$ represents the objective function of the second generator, $L_D^S$ represents the objective function of the second discriminator, and $L_{Dfake}^S$ represents the loss function of the second discriminator with respect to false pictures, whose detailed explanations are shown above and will not be repeated herein; $L_G^T$ represents the objective function of the first generator, $L_{Dfake}^T$ represents the loss function of the first discriminator with respect to false pictures, $G^T(Z)$ represents a false picture generated by the first generator according to a noise signal, $D^T(G^T(Z))$ represents a response value of the first discriminator to the false picture generated by the first generator, $f_G^T(-D^T(G^T(Z)))$ represents the loss function of the first generator, $f_D^T(D^T(G^T(Z)))$ represents the loss function of the first discriminator with respect to false pictures generated by the first generator, E(*) represents an expected value of the distribution function, and p(z) represents the noise distribution.

S250: freezing a retention factor corresponding to each convolution kernel in the second discriminator, and determining a second weight parameter of the second generator according to the objective function of the second generator; and determining a first weight parameter of the second discriminator according to the objective function of the second discriminator.

Specifically, the specific implementation for S250 may be set by those skilled in the art according to the actual situation, and is not limited herein.

Illustratively, the retention factor for each convolution kernel remains unchanged, and the second weight parameter of the second generator is updated such that the objective function $L_G^S$ of the second generator becomes smaller, and thus the second weight parameter of the second generator is determined; the first weight parameter of the second discriminator is updated such that the objective function $L_D^S$ of the second discriminator becomes smaller, and thus the first weight parameter of the second discriminator is determined.

S260: freezing the first weight parameter of the second discriminator and the second weight parameter of the second generator, and determining the retention factors according to the objective function of the retention factors.

Specifically, the specific implementation for S260 may be set by those skilled in the art according to the actual situation, and is not limited herein.

Illustratively, the second weight parameter of the second generator and the first weight parameter of the second discriminator remain unchanged, and the retention factor for each convolution kernel is updated, such that the objective function $L_{arch}$ of the retention factor becomes smaller, and thus the respective retention factors are determined.

S270: determining a second loss difference between the second generator and the second discriminator according to the objective function of the second generator and the loss function of the second discriminator with respect to false pictures.

Specifically, the specific implementation for S270 may be set by those skilled in the art according to the actual situation, and is not limited herein. In one possible embodiment, the absolute value of the difference value between the objective function of the second generator and the loss function of the second discriminator with respect to false pictures is taken as a second loss difference.

Illustratively, the second loss difference is as follows:

$$\Delta L^S = \left| L_G^S - L_{Dfake}^S \right|;$$

where $\Delta L^S$ represents the second loss difference, and the specific explanations of $L_G^S$ and $L_{Dfake}^S$ are shown above and will not be repeated herein.

S280: determining whether an absolute value of the difference value between a first loss difference and the second loss difference is less than a first preset threshold or not; if yes, ending the training; and if no, returning to perform S250.

Specifically, the specific implementation for S280 may be set by those skilled in the art according to the actual situation, and is not limited herein.

In one possible embodiment, the absolute value of the difference value between the objective function of the first generator and the loss function of the first discriminator with respect to false pictures is taken as the first loss difference; an absolute value of the difference value between the first loss difference and the second loss difference is calculated; and whether the absolute value of the difference between the first loss difference and the second loss difference is less than the first preset threshold or not is determined.

Illustratively, the first loss difference is as follows:

$$\Delta L^T = \left| L_G^T - L_{Dfake}^T \right|;$$

where $\Delta L^T$ represents the first loss difference, and the specific explanations of $L_G^T$ and $L_{Dfake}^T$ are shown above and will not be repeated herein.

Then the absolute value of the difference value between the first loss difference and the second loss difference is as follows:

$$\Delta L = \left| \Delta L^S - \Delta L^T \right|;$$

then whether the absolute value $\Delta L$ of the difference between the first loss difference and the second loss difference is less than the first preset threshold or not is determined; if yes, the training is ended; if no, return to perform S250.

In the embodiments of the present disclosure, the objective function of the second generator is determined according to the loss function of the second generator, and the second weight parameter of the second generator is determined according to the objective function of the second generator; the objective function of the second discriminator is determined according to the loss function of the second discriminator with respect to real pictures and the loss function of the second discriminator with respect to false pictures, and the first weight parameter of the second discriminator is determined according to the objective function of the second discriminator; the objective function of the retention factors is determined according to the objective function of the first generator, the loss function of the first discriminator with respect to false pictures, the objective function of the second generator, the objective function of the second discriminator, and the loss function of the second discriminator with respect to false pictures, and the retention factors are determined according to the objective function of the retention factors. The loss function of the second generator and the loss function of the second discriminator with respect to false pictures can be reduced in the process of approximating the second loss difference to the first loss difference, and moreover, the loss function of the second discriminator with respect to real pictures can be improved, and thus the performance of the second generator and the second discriminator is optimized.

Figure 3:
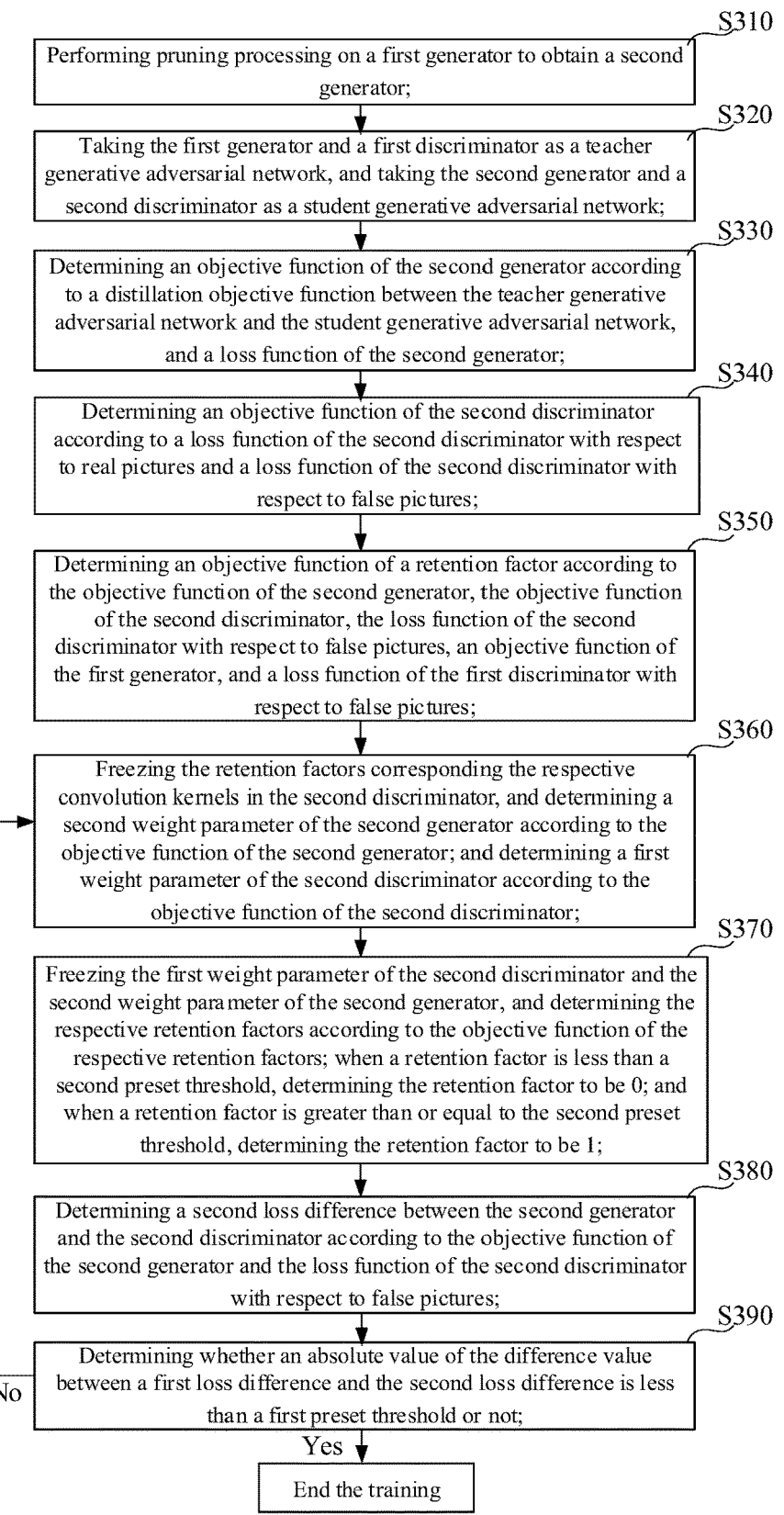
FIG. 3 is a flowchart of a network model compression method according to an embodiment of the present disclosure.

FIG. 3 is a flowchart of a network model compression method according to an embodiment of the present disclosure. As shown in FIG. 3, the method of the present embodiment includes the following S310-S390.

S310: performing pruning processing on a first generator to obtain a second generator.

S320: taking the first generator and a first discriminator as a teacher generative adversarial network, and taking the second generator and a second discriminator as a student generative adversarial network.

S330: determining an objective function of the second generator according to a distillation objective function between the teacher generative adversarial network and the student generative adversarial network, and a loss function of the second generator.

Specifically, the first generator and the first discriminator are a well-trained network model with good accuracy and stability. The network model is taken as the teacher generative adversarial network to guide the student generative adversarial network for learning, which is beneficial to improving the performance of the second generator. There is usually a distillation loss when the teacher generative adversarial network guides the student generative adversarial network for learning, and the distillation loss can be reduced by optimizing the distillation objective function.

Specifically, the specific implementation for determining the distillation objective function may be set by those skilled in the art according to the actual situation, and is not limited herein.

In one possible embodiment, the specific implementation for determining the distillation objective function is as follows: determining a first similarity metric function according to a similarity between intermediate feature maps of at least one layer in the first generator and the second generator; inputting false pictures generated by the first generator into the first discriminator to obtain a first intermediate feature map of at least one layer in the first discriminator; inputting false pictures generated by the second generator into the first discriminator to obtain a second intermediate feature map of at least one layer in the first discriminator; determining a second similarity metric function according to a similarity between the first intermediate feature map of the at least one layer and the second intermediate feature map of the at least one layer; and determining the distillation objective function according to the first similarity metric function and the second similarity metric function.

Specifically, an intermediate feature map of the first generator refers to output information from a certain layer of the first generator; and an intermediate feature map of the second generator refers to output information from a certain layer of the second generator.

Specifically, the intermediate feature maps used for determining the first similarity metric function have the following characteristics: the intermediate feature maps obtained from the first generator correspond to the intermediate feature maps obtained from the second generator in a one-to-one manner; that is, when an intermediate feature map of a certain layer (e.g., the first layer) is obtained from the first generator, an intermediate feature map with the same number of network layer (e.g., the first layer) needs to be obtained from the second generator. The intermediate feature maps obtained from which layers of the first generator and the second generator may be set by those skilled in the art according to the actual situation, and are not limited herein.

Specifically, the first similarity metric function is used for characterizing the degree of approximation of the intermediate layer information of the first generator and the second generator. The specific method for determining the first similarity metric function may be set by those skilled in the art according to the actual situation.

In one possible embodiment, determining the first similarity metric function according to the similarity between intermediate feature maps of at least one layer in the first generator and the second generator includes: inputting an intermediate feature map of an i-th layer in the first generator and an intermediate feature map of an i-th layer in the second generator into a similarity metric function to obtain a first sub-similarity metric function corresponding to the i-th layer, where i is a positive integer, i takes a value from 1 to M, and M is the total number of layers of the first generator and the second generator; and determining the first similarity metric function according to first sub-similarity metric functions corresponding to respective layers.

Specifically, the specific structure of the similarity metric function may be set by those skilled in the art according to the actual situation, and it is not limited herein. In one possible embodiment, the similarity metric function includes an MSE loss function and a Texture loss function.

Illustratively, the similarity metric function is as follows:

$$d(*, *) = \frac{1}{c_1^2} \sqrt{\sum\nolimits_{p,q} \left( G_{pq}(\hat{O}) - G_{pq}(O) \right)^2} ;$$

where $\hat{O}$, $O$ represent two different intermediate feature maps inputted into the similarity metric function, respectively, $G_{pq}(\hat{O})$ represents an inner product between the feature of a p-th channel and the feature of a q-th channel in an intermediate feature map $\hat{O}$, $G_{ij}(O)$ represents an inner product between the feature of a p-th channel and the feature of a q-th channel in an intermediate feature map $O$, $c_I$ represents the total number of channels in the intermediate feature maps $\hat{O}$, $O$ inputted into the similarity metric function, and $$\sqrt{\sum\nolimits_{p,q} \left( G_{pq}(\hat{O}) - G_{pq}(O) \right)^2}$$

represents the MSE loss function.

Illustratively, the first similarity metric function is as follows:

$$D_1 = \sum\nolimits_{i=1}^{L_G} E_{z \sim p(z)} \big[ d\big( f_i(G_i^S(z)), G_i^T(z) \big) \big];$$

where $D_1$ represents the first similarity metric function, $L_G$ represents the total number of intermediate feature maps obtained from the first generator, $p(z)$ represents the noise distribution, $$d\big( f_i(G_i^S(z)), G_i^T(z) \big)$$

represents a first sub-similarity metric function corresponding to the i-th layer, $$G_i^S(z)$$

represents the intermediate feature map obtained from the i-th layer of the second generator, $$G_i^T(z)$$

represents the intermediate feature map obtained from the i-th layer of the first generator, and $$f_i(G_i^S(z))$$

represents a learnable 1×1 convolutional layer used for converting the total number of channels of $$G_i^S(z)$$

into the same number of the total number of channels of $$G_i^T(z).$$

Specifically, the first intermediate feature map refers to output information from a certain layer of the first discriminator when a false picture generated by the first generator is input into the first discriminator; and the second intermediate feature map refers to output information from a certain layer of the first discriminator when a false picture generated by the second generator is input into the first discriminator.

It should be understood that, compared with an additional network model used for extracting the intermediate feature maps of the first generator and the second generator, the first discriminator used for extracting the intermediate feature maps of the first generator and the second generator in the embodiments of the present disclosure has the advantage of having a high correlation to the generation tasks of the first generator and the second generator and having a good capability of distinguishing the real images from the false images.

Specifically, the first intermediate feature maps correspond to the second intermediate feature maps in a one-to-one manner; that is, when the first intermediate feature map is an intermediate feature map of a certain layer (e.g., the first layer) in the first discriminator, its corresponding second intermediate feature map is an intermediate feature map of this layer (e.g., the first layer) in the second discriminator. The intermediate feature maps obtained from which layers of the first discriminator and the second discriminator may be set by those skilled in the art according to the actual situation, and are not limited herein.

Specifically, the second similarity metric function is used for characterizing the degree of approximation of the intermediate layer information of the first discriminator and the second discriminator. The specific method for determining the second similarity metric function may be set by those skilled in the art according to the actual situation.

In one possible embodiment, determining the second similarity metric function according to a similarity between the first intermediate feature map and the second intermediate feature map corresponding to each layer includes: inputting a first intermediate feature map and a second intermediate feature map corresponding to a j-th layer into a similarity metric function to obtain a second sub-similarity metric function corresponding to the j-th layer, where j is a positive integer, $1 \leq j \leq N$, j take a value from 1 to N, and N is the total number of layers of the first discriminator; and determining the second similarity metric function according to second sub-similarity metric functions corresponding to respective layers.

Illustratively, the second similarity metric function is as follows:

$$D_2 = \sum\nolimits_{j=1}^{L_D} E_{z \sim p(z)} \big[ d\big( D_j^T(G^S(z)), D_j^T(G^T(z)) \big) \big];$$

where $D_2$ represents the second similarity metric function, $L_D$ represents the total number of intermediate feature maps obtained from the first discriminator, $p(z)$ represents the noise distribution, $$d\big( D_j^T(G^S(z)), D_j^T(G^T(z)) \big)$$

represents a second sub-similarity metric function corresponding to the j-th layer, $$D_j^T(G^T(z))$$

represents the first intermediate feature map corresponding to the j-th layer, and $$D_j^T(G^S(z))$$

represents a second intermediate feature map corresponding to the j-th layer.

Specifically, the specific implementation for determining the distillation objective function according to the first similarity metric function and the second similarity metric function may be set by those skilled in the art according to the actual situation, and is not limited herein.

In one possible embodiment, the first similarity metric function and the second similarity metric function are summed according to weights to determine the distillation objective function.

In one possible embodiment, the first similarity metric function and the second similarity metric function are directly summed to determine the distillation objective function.

Illustratively, the distillation objective function is as follows:

$$\mathcal{L}_{distill} = D_1 + D_2;$$

where $\mathcal{L}_{distill}$ represents the distillation objective function, $D_1$ represents the first similarity metric function, and $D_2$ represents the second similarity metric function.

Specifically, the specific implementation for S330 may be set by those skilled in the art according to the actual situation, and is not limited herein.

In one possible embodiment, the distillation objective function and the objective function component determined according to the loss function of the second generator are directly summed to determine the objective function of the second generator.

In one possible embodiment, the distillation objective function and the objective function component determined according to the loss function of the second generator are summed according to weights to determine the objective function of the second generator.

Illustratively, the objective function of the second generator is as follows:

$$L_G^S = \left(L_G^S\right)' + \gamma L_{distill};$$

$$\left(L_G^S\right)' = E_{z \sim p(z)}\left[f_G^S\left(-D^S\left(G^S(Z)\right)\right)\right];$$

where $(L_G^S)'$ represents the objective function component determined according to the loss function of the second generator. It should be understood by those skilled in the art that when the first generator and the first discriminator are not taken as the teacher generative adversarial network, $(L_G^S)'$ may be the objective function of the second generator, as shown in the example of the method in FIG. 2. Therefore, the specific explanation of $(L_G^S)'$ is shown above and will not be repeated herein. $L_{distill}$ represents the distillation objective function, and $\gamma$ represents the weight parameter of the distillation objective function.

S340: determining an objective function of the second discriminator according to a loss function of the second discriminator with respect to real pictures and a loss function of the second discriminator with respect to false pictures.

S350: determining an objective function of a retention factor according to the objective function of the second generator, the objective function of the second discriminator, the loss function of the second discriminator with respect to false pictures, an objective function of the first generator, and a loss function of the first discriminator with respect to false pictures.

S360: freezing the retention factors corresponding the respective convolution kernels in the second discriminator, and determining a second weight parameter of the second generator according to the objective function of the second generator; and determining a first weight parameter of the second discriminator according to the objective function of the second discriminator.

S370: freezing the first weight parameter of the second discriminator and the second weight parameter of the second generator, and determining the respective retention factors according to the objective function of the respective retention factors; when a retention factor is less than a second preset threshold, determining the retention factor to be 0; and when a retention factor is greater than or equal to the second preset threshold, determining the retention factor to be 1.

Specifically, the specific value of the second preset threshold may be set by those skilled in the art according to the actual situation, and it is not limited herein.

It should be understood that, by setting the retention factor to be 0 when the value of the retention factor is less than the second preset threshold, and setting the retention factor to be 1 when the value of the retention factor is greater than or equal to the second preset threshold, the process of setting the convolution kernels in a part of the first discriminator to be in the activated state and setting the convolution kernels in the other part of the first discriminator to be in the suppressed state is sped up, thereby improving the compression efficiency of the network model.

S380: determining a second loss difference between the second generator and the second discriminator according to the objective function of the second generator and the loss function of the second discriminator with respect to false pictures.

S390: determining whether an absolute value of the difference value between a first loss difference and the second loss difference is less than a first preset threshold or not; if yes, ending the training; and if no, returning to perform S360.

In the embodiments of the present disclosure, the intermediate layer feature maps in the first generator and the first discriminator are simultaneously utilized through the distillation method as additional supervision information to help the second generator to generate high-quality images. In this way, a lightweight second generator can be obtained, and it can also be ensured that the lightweight second generator can generate high-quality images.

FIG. 4 is a flowchart of an image generation method according to an embodiment of the present disclosure, and the method can be executed by an electronic device. The electronic device may be illustratively understood as a device with a computing function, such as a portable Android device, a laptop computer, or a desktop computer. As shown in FIG. 4, the method of the present embodiment includes the following S410-S420.

S410: inputting a random noise signal into a second generator to enable the second generator to generate a false image according to the random noise signal.

S420: inputting the false image into a second discriminator to enable that the second discriminator discriminates that the false image is true and then outputs the false image.

In the steps, the second generator and the second discriminator are obtained by using the method according to any of the embodiments in FIG. 1 to FIG. 3 described above.

In the embodiments of the present disclosure, the second generator for generating a false image and the second discriminator for outputting the false image are obtained by using the network model compression method provided in the embodiments of the present disclosure. Because the second generator and the second discriminator are relatively lightweight, even if they are deployed to edge devices with limited resources, there will be no longer delay.

FIG. 5 is a schematic diagram of a structure of a network model compression apparatus according to an embodiment of the present disclosure, and the network model compression apparatus may be understood as the network model compression device described above or part of functional modules in the network model compression device described above. The network model compression apparatus can compress a network model to be compressed, and the network model to be compressed includes a first generator and a first discriminator. As shown in FIG. 5, the network model compression apparatus 500 includes a pruning module 510 and a configuration module 520.

The pruning module 510 is configured to perform pruning processing on the first generator to obtain a second generator.

The configuration module 520 is configured to configure states of convolution kernels in the first discriminator to enable a part of the convolution kernels to be in an activated state and the other part of the convolution kernels to be in a suppressed state, so as to obtain a second discriminator.

A loss difference between the first generator and the first discriminator is a first loss difference, a loss difference between the second generator and the second discriminator is a second loss difference, and an absolute value of a difference between the first loss difference and the second loss difference is less than a first preset threshold.

In one embodiment, the configuration module 520 includes:

a first determination submodule that may be configured to freeze a retention factor corresponding to each convolution kernel in the second discriminator, and determine a first weight parameter of the second discriminator, in which the retention factor is used for characterizing the importance of a convolution kernel corresponding the retention factor;

a second determination submodule that may be configured to freeze the first weight parameter of the second discriminator and a second weight parameter of the second generator, and determine respective retention factors;

and a repetition submodule that may be configured to repeatedly perform operations of determining the first weight parameter of the second discriminator and determining the respective retention factors until the absolute value of the difference value between the first loss difference and the second loss difference is less than the first preset threshold.

In one embodiment, the first weight parameter includes weight parameters corresponding to other elements in the second discriminator other than the respective retention factors.

In one embodiment, the second weight parameter includes weight parameters corresponding to elements in the second generator.

In one embodiment, the first determination submodule includes:

a first determination unit that may be configured to determine the second weight parameter of the second generator according to an objective function of the second generator;

and a second determination unit that may be configured to determine the first weight parameter of the second discriminator according to an objective function of the second discriminator.

In one embodiment, the apparatus further includes:

an objective function determination module of the second generator, which may be configured to determine, before the second weight parameter of the second generator are determined according to the objective function of the second generator, the objective function of the second generator according to a loss function of the second generator;

and an objective function determination module of the second discriminator, which may be configured to determine the objective function of the second discriminator according to a loss function of the second discriminator with respect to real pictures and a loss function of the second discriminator with respect to false pictures.

In one embodiment, the apparatus further includes a teacher and student determination module that may be configured to take, before the objective function of the second generator is determined according to the loss function of the second generator, the first generator and the first discriminator as a teacher generative adversarial network, and take the second generator and the second discriminator as a student generative adversarial network;

and the objective function determination module of the second generator may be specifically configured to determine the objective function of the second generator according to a distillation objective function between the teacher generative adversarial network and the student generative adversarial network, and the loss function of the second generator.

In one embodiment, the objective function determination module of the second generator may be specifically configured to sum, according to weights, the distillation objective function and an objective function component determined according to the loss function of the second generator, to determine the objective function of the second generator.

In one embodiment, the apparatus further includes:

a first similarity metric function determination module that may be configured to determine, before the objective function of the second generator is determined according to the distillation objective function between the teacher generative adversarial network and the student generative adversarial network, and the loss function of the second generator, a first similarity metric function according to a similarity between intermediate feature maps of at least one layer in the first generator and the second generator;

a first intermediate feature map acquisition module that may be configured to input false pictures generated by the first generator into the first discriminator to obtain a first intermediate feature map of at least one layer in the first discriminator;

a second intermediate feature map acquisition module that may be configured to input false pictures generated by the second generator into the first discriminator to obtain a second intermediate feature map of at least one layer in the first discriminator;

a second similarity metric function determination module that may be configured to determine a second similarity metric function according to a similarity between the first intermediate feature map of the at least one layer and the second intermediate feature map of the at least one layer;

and a distillation objective function determination module that may be configured to determine the distillation objective function according to the first similarity metric function and the second similarity metric function.

In one embodiment, the first similarity metric function determination module includes:

a first sub-similarity metric function determination submodule that may be configured to input an intermediate feature map of an i-th layer in the first generator and an intermediate feature map of an i-th layer in the second generator into a similarity metric function to obtain a first sub-similarity metric function corresponding to the i-th layer, where i is a positive integer, i takes a value from 1 to M, and M is the total number of layers of the first generator and the second generator;

and a first similarity metric function determination submodule that may be configured to determine the first similarity metric function according to first sub-similarity metric functions corresponding to respective layers.

In one embodiment, the second similarity metric function determination module includes:

a second sub-similarity metric function determination submodule that may be configured to input a first intermediate feature map and a second intermediate feature map corresponding to a j-th layer into a similarity metric function to obtain a second sub-similarity metric function corresponding to the j-th layer, where j is a positive integer, $1 \leq j \leq N$, j takes a value from 1 to N, and N is the total number of layers of the first discriminator;

and a second similarity metric function determination submodule that may be configured to determine the second similarity metric function according to second sub-similarity metric functions corresponding to respective layers.

In one embodiment, the second determination submodule includes:

a third determination unit that may be configured to determine the respective retention factors according to an objective function of the respective retention factors;

a fourth determination unit that may be configured to determine a retention factor to be 0 when the retention factor is less than a second preset threshold;

and a fifth determination unit that may be configured to determine a retention factor to be 1 when the retention factor is greater than or equal to the second preset threshold.

In one embodiment, the apparatus further includes an objective function determination module for the retention factor, which may be configured to determine, before the respective retention factors are determined according to the objective function of the respective retention factors, the objective function of the respective retention factors according to an objective function of the second generator, an objective function of the second discriminator, a loss function of the second discriminator with respect to false pictures, an objective function of the first generator, and a loss function of the first discriminator with respect to false pictures.

The apparatus of the present embodiment can execute the method of any of the embodiments in FIG. 1 to FIG. 3 described above, whose execution mode and beneficial effects are similar and will not be repeated herein.

Illustratively, FIG. 6 is a schematic diagram of a structure of a network model compression device according to an embodiment of the present disclosure. Referring specifically to FIG. 6 below, a schematic diagram of a structure of a network model compression device 600 suitable for implementation in the embodiments of the present disclosure is shown. The network model compression device 600 in the embodiments of the present disclosure may include, but is not limited to, a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and a fixed terminal such as a digital TV, a desktop computer, or the like. The network model compression device illustrated in FIG. 6 is merely an example, and should not pose any limitation to the functions and the range of use of the embodiments of the present disclosure.

As shown in FIG. 6, the network model compression device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the network model compression device 600. The processing apparatus 601, the ROM 602, and the RAM 603 are interconnected by means of a bus 604. An input/output (I/O) interface 605 is also connected to the bus 604.

Usually, the following apparatuses may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the network model compression device 600 to be in wireless or wired communication with other devices to exchange data. While FIG. 6 illustrates the network model compression device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned network model compression device, or may also exist alone without being assembled into the network model compression device.

The computer-readable medium carries one or more programs. The one or more programs, when executed by the network model compression device, cause the network model compression device to: perform pruning processing on the first generator to obtain the second generator; and configure the states of the convolution kernels in the first discriminator to enable a part of the convolution kernels to be in the activated state and the other part of the convolution kernels to be in the suppressed state, so as to obtain the second discriminator, where the loss difference between the first generator and the first discriminator is the first loss difference, the loss difference between the second generator and the second discriminator is the second loss difference, and the absolute value of the difference between the first loss difference and the second loss difference is less than the first preset threshold.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The embodiments of the present disclosure further provide a computer-readable storage medium storing a computer program. The computer program, when executed by a processor, implements the method of any of the embodiments in FIG. 1 to FIG. 3, whose execution mode and beneficial effects are similar and will not be repeated herein.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A network model compression method, a network model to be compressed comprising a first generator and a first discriminator, and the network model compression method comprising:

performing pruning processing on the first generator to obtain a second generator; and configuring states of convolution kernels in the first discriminator to enable a part of the convolution kernels to be in an activated state and the other part of the convolution kernels to be in a suppressed state, so as to obtain a second discriminator, wherein generating a first loss difference between a performance of the first generator and a performance of the first discriminator, and generating a second loss difference between a performance of the second generator and a performance of the second discriminator such that an absolute value of a difference value between the first loss difference and the second loss difference is less than a first preset threshold, wherein configuring states of convolution kernels in the first discriminator to enable a part of the convolution kernels to be in an activated state and the other part of the convolution kernels to be in a suppressed state, so as to obtain a second discriminator, comprises:

freezing a retention factor corresponding to each convolution kernel in the second discriminator, and determining a first weight parameter of the second discriminator, wherein the retention factor is used for characterizing importance of a convolution kernel corresponding the retention factor;

freezing the first weight parameter of the second discriminator and a second weight parameter of the second generator, and determining respective retention factors; and repeatedly performing operations of determining the first weight parameter of the second discriminator and determining the respective retention factors until the absolute value of the difference value between the first loss difference and the second loss difference is less than the first preset threshold.

2. The network model compression method according to claim 1, wherein the first weight parameter comprises weight parameters corresponding to other elements in the second discriminator other than the respective retention factors.

3. The network model compression method according to claim 1, wherein the second weight parameter comprises weight parameters corresponding to elements in the second generator.

4. The network model compression method according to claim 1, wherein determining a first weight parameter of the second discriminator comprises:

determining the first weight parameter of the second discriminator according to an objective function of the second discriminator; and the network model compression method further comprises:

determining the second weight parameter of the second generator according to an objective function of the second generator.

5. The network model compression method according to claim 4, wherein before determining the second weight parameter of the second generator according to an objective function of the second generator, the network model compression method further comprises:

determining the objective function of the second generator according to a loss function of the second generator; and determining the objective function of the second discriminator according to a loss function of the second discriminator with respect to real pictures and a loss function of the second discriminator with respect to false pictures.

6. The network model compression method according to claim 5, wherein before determining the objective function of the second generator according to a loss function of the second generator, the network model compression method further comprises:

taking the first generator and the first discriminator as a teacher generative adversarial network, and taking the second generator and the second discriminator as a student generative adversarial network; and determining the objective function of the second generator according to a loss function of the second generator comprises:

determining the objective function of the second generator according to a distillation objective function between the teacher generative adversarial network and the student generative adversarial network, and the loss function of the second generator.

7. The network model compression method according to claim 6, wherein determining the objective function of the second generator according to a distillation objective function between the teacher generative adversarial network and the student generative adversarial network, and the loss function of the second generator, comprises:

summing, according to weights, the distillation objective function and an objective function component determined according to the loss function of the second generator, to determine the objective function of the second generator.

8. The network model compression method according to claim 6, wherein before determining the objective function of the second generator according to a distillation objective function between the teacher generative adversarial network and the student generative adversarial network, and the loss function of the second generator, the network model compression method further comprises:

determining a first similarity metric function according to a similarity between intermediate feature maps of at least one layer in the first generator and the second generator;

inputting false pictures generated by the first generator into the first discriminator to obtain a first intermediate feature map of at least one layer in the first discriminator;

inputting false pictures generated by the second generator into the first discriminator to obtain a second intermediate feature map of at least one layer in the first discriminator;

determining a second similarity metric function according to a similarity between the first intermediate feature map of the at least one layer and the second intermediate feature map of the at least one layer; and determining the distillation objective function according to the first similarity metric function and the second similarity metric function.

9. The network model compression method according to claim 8, wherein determining a first similarity metric function according to a similarity between intermediate feature maps of at least one layer in the first generator and the second generator, comprises:

inputting an intermediate feature map of an i-th layer in the first generator and an intermediate feature map of an i-th layer in the second generator into a similarity metric function to obtain a first sub-similarity metric function corresponding to the i-th layer, wherein i is a positive integer, i takes a value from 1 to M, and M is a total number of layers of the first generator and the second generator; and determining the first similarity metric function according to first sub-similarity metric functions corresponding to respective layers.

10. The network model compression method according to claim 8, wherein determining a second similarity metric function according to a similarity between the first intermediate feature map of the at least one layer and the second intermediate feature map of the at least one layer, comprises:

inputting a first intermediate feature map and a second intermediate feature map corresponding to a j-th layer into a similarity metric function to obtain a second sub-similarity metric function corresponding to the j-th layer, wherein j is a positive integer, $1 \leq j \leq N$, j takes a value from 1 to N, and N is a total number of layers of the first discriminator; and determining the second similarity metric function according to second sub-similarity metric functions corresponding to respective layers.

11. The network model compression method according to claim 1, wherein determining the respective retention factors comprises:

determining the respective retention factors according to an objective function of the respective retention factors;

when a retention factor is less than a second preset threshold, determining the retention factor to be 0; and when a retention factor is greater than or equal to the second preset threshold, determining the retention factor to be 1.

12. The network model compression method according to claim 11, wherein before determining the respective retention factors according to an objective function of the respective retention factors, the network model compression method further comprises:

determining the objective function of the respective retention factors according to an objective function of the second generator, an objective function of the second discriminator, a loss function of the second discriminator with respect to false pictures, an objective function of the first generator, and a loss function of the first discriminator with respect to false pictures.

13. An image generation method, comprising:

inputting a random noise signal into a second generator to enable the second generator to generate a false image according to the random noise signal; and inputting the false image into a second discriminator to enable that the second discriminator discriminates that the false image is true and then outputs the false image, wherein the second generator and the second discriminator are obtained by using the network model compression method according to claim 1.

14. A network model compression device, comprising:

a memory, storing a computer program; and a processor, configured to execute the computer program, wherein the computer program, when executed by the processor, causes the processor to perform a network model compression method, a network model to be compressed comprises a first generator and a first discriminator, and the network model compression method comprises:

performing pruning processing on the first generator to obtain a second generator; and configuring states of convolution kernels in the first discriminator to enable a part of the convolution kernels to be in an activated state and the other part of the convolution kernels to be in a suppressed state, so as to obtain a second discriminator, wherein generating a first loss difference between a performance of the first generator and a performance of the first discriminator, and generating a second loss difference between a performance of the second generator and a performance of the second discriminator such that an absolute value of a difference value between the first loss difference and the second loss difference is less than a first preset threshold, wherein configuring states of convolution kernels in the first discriminator to enable a part of the convolution kernels to be in an activated state and the other part of the convolution kernels to be in a suppressed state, so as to obtain a second discriminator, comprises:

freezing a retention factor corresponding to each convolution kernel in the second discriminator, and determining a first weight parameter of the second discriminator, wherein the retention factor is used for characterizing importance of a convolution kernel corresponding the retention factor;

freezing the first weight parameter of the second discriminator and a second weight parameter of the second generator, and determining respective retention factors; and repeatedly performing operations of determining the first weight parameter of the second discriminator and determining the respective retention factors until the absolute value of the difference value between the first loss difference and the second loss difference is less than the first preset threshold.

15. A non-transitory computer-readable storage medium, storing a computer program, wherein the computer program, when executed by a processor, implements the network model compression method according to claim 1.

16. The network model compression device according to claim 14, wherein the first weight parameter comprises weight parameters corresponding to other elements in the second discriminator other than the respective retention factors.

17. The network model compression device according to claim 14, wherein the second weight parameter comprises weight parameters corresponding to elements in the second generator.

30

* * * * *